(12) United States Patent
Nowshadi et al.

(10) Patent No.: US 11,930,461 B2
(45) Date of Patent: Mar. 12, 2024

(54) CARRIER FREQUENCY ERROR ESTIMATION USING A BANK OF ESTIMATORS WITH LIMITED ACQUISITION RANGE

(71) Applicant: SAMSUNG ELECTRONICS CO., LTD., Suwon-si (KR)

(72) Inventors: Farshid Nowshadi, Cambridge (GB); Jacob Christopher Sharpe, Cambridge (GB)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 55 days.

(21) Appl. No.: 17/812,852

(22) Filed: Jul. 15, 2022

(65) Prior Publication Data

US 2024/0023038 A1    Jan. 18, 2024

(51) Int. Cl.
*H04W 56/00* (2009.01)
*H04L 27/00* (2006.01)

(52) U.S. Cl.
CPC ....... *H04W 56/001* (2013.01); *H04L 27/0014* (2013.01); *H04L 2027/003* (2013.01)

(58) Field of Classification Search
CPC ............. H04W 56/001; H04L 27/0014; H04L 2027/003
See application file for complete search history.

(56) References Cited

U.S. PATENT DOCUMENTS

| | | | |
|---|---|---|---|
| 7,561,628 B2 | 7/2009 | Sung et al. | |
| 7,564,909 B2 | 7/2009 | Sung et al. | |
| 8,155,250 B2 | 4/2012 | Capretta et al. | |
| 8,649,752 B2 | 2/2014 | Swarts et al. | |
| 8,824,606 B2 | 9/2014 | Cheng et al. | |
| 9,184,971 B2 | 11/2015 | Lerner et al. | |
| 9,729,195 B2 | 8/2017 | Tamma et al. | |
| 9,847,809 B2 | 12/2017 | Engelien-Lopes et al. | |
| 9,853,787 B2 | 12/2017 | Stanciu et al. | |
| 10,469,125 B2* | 11/2019 | Robertson | H04W 12/12 |
| 10,511,472 B2 | 12/2019 | Chu et al. | |
| 11,133,890 B2 | 9/2021 | Fort | |
| 2017/0094623 A1* | 3/2017 | Raza | H04L 1/0058 |
| 2017/0201404 A1* | 7/2017 | Su | H04L 27/2273 |
| 2018/0234358 A1 | 8/2018 | Jakubov et al. | |
| 2023/0253954 A1* | 8/2023 | Scarpa | H03J 7/047 455/192.2 |

\* cited by examiner

*Primary Examiner* — Dac V Ha
(74) *Attorney, Agent, or Firm* — F. CHAU & ASSOCIATES, LLC

(57) ABSTRACT

Techniques and systems for extending the capture range of frequency offset error detection are described. For instance, the present disclose describes efficient frequency estimation structures (e.g., zero crossing minimum/maximum (min/max) structures) that may extend carrier frequency offset error capture range by running a bank (e.g., a set) of parallel capture range structures trialing different frequency errors. In some aspects, a set of frequency offset estimation circuits and a set of correlation circuits (e.g., 1-bit correlators) may be used on parallel streams to perform correlation operations on each branch of a received bit stream to determine correlations with known preamble patterns (e.g., to accurately estimate large frequency offset errors).

20 Claims, 8 Drawing Sheets

CARRIER FREQUENCY ERROR ESTIMATION USING A BANK OF ESTIMATORS WITH LIMITED ACQUISITION RANGE

BACKGROUND

The following relates generally to wireless communications, and more specifically to Bluetooth carrier frequency error estimation using a bank of estimators with limited acquisition range.

Communications systems (e.g., wireless communications systems) are deployed to provide various communication services such as data services, video services, audio services, messaging services, telecommunication services, broadcast services, etc. Further, communications systems may employ various technologies according to certain protocols to support communications between devices (e.g., to make communications compatible between differing devices, to share available system resources efficiently, etc.).

Communications devices may implement communication techniques using various hardware and software components, which in some examples may include usage of a crystal oscillator. A crystal oscillator is a device that typically employs an amplifier and a crystal to generate a fixed frequency signal (e.g., based on the intrinsic frequency of a piezoelectric crystal resonator). The crystal is made from of a small slice of piezoelectric material having a shape that physically resonates at a desired (natural) frequency, such that the crystal acts like a filter having a bandpass around its natural frequency. The natural frequency is a function of a process type and size of the crystal. The fixed frequency signal of the crystal oscillator is variable according to the crystal's natural frequency and frequency tuning circuitry coupled to the crystal. Thus, the crystal oscillator is formed by a combination of the crystal within a circuit that resonates at or near the natural frequency of the crystal.

However, different communications devices (e.g., a transmitting device and a receiving device with differing components, capabilities, etc.) may have different crystal references based on the local oscillators of the specific devices. In some examples, certain devices may have crystal references outside of typical ranges assumed by other devices for engaging in communications. For instance, devices from certain geographical regions, devices manufactured using cheap components including cheap oscillators, etc. may have crystal references that may not comply with certain communications standards or with operating assumptions of other devices. Such may result in various complications such as device incompatibility, reduced communications throughput, packet loss, etc. Accordingly, there is a need in the art for further improvements in wireless communications systems to overcome such challenges (as well as other challenges).

SUMMARY

A method, apparatus, non-transitory computer readable medium, and system for carrier frequency error estimation (e.g., Bluetooth carrier frequency error estimation using a bank of estimators with limited acquisition range) are described. One or more aspects of the method, apparatus, non-transitory computer readable medium, and system include identifying a plurality of baseline frequencies; estimating a plurality of frequency offsets for a signal, wherein each of the plurality of frequency offsets corresponds to a baseline frequency of the plurality baseline frequencies; selecting a frequency offset from the plurality of frequency offsets; and demodulating the signal using the selected frequency offset.

A method, apparatus, non-transitory computer readable medium, and system for carrier frequency error estimation (e.g., Bluetooth carrier frequency error estimation using a bank of estimators with limited acquisition range) are described. One or more aspects of the method, apparatus, non-transitory computer readable medium, and system include identifying a plurality of baseline frequencies; selecting a plurality of sample sets from a signal, wherein each of the samples sets corresponds to one of the plurality of baseline frequencies; detecting a zero crossing point corresponding to each of the plurality of baseline frequencies based on the corresponding sample set; estimating a frequency offset for each of the plurality of baseline frequencies based on the corresponding zero crossing point; and selecting the frequency offset corresponding to a highest correlation value for demodulating the signal.

An apparatus, system, and method for carrier frequency error estimation (e.g., Bluetooth carrier frequency error estimation using a bank of estimators with limited acquisition range) are described. One or more aspects of the apparatus, system, and method include a receiver configured to receive a signal; a plurality of frequency offset estimation circuits configured to estimate a plurality of frequency offsets for the signal, wherein each of the plurality of frequency offset estimation circuits operates based on a different baseline frequency from a plurality baseline frequencies; and an offset selection circuit configured to select a frequency offset from the plurality of frequency offsets.

DETAILED DESCRIPTION

Figure 1:
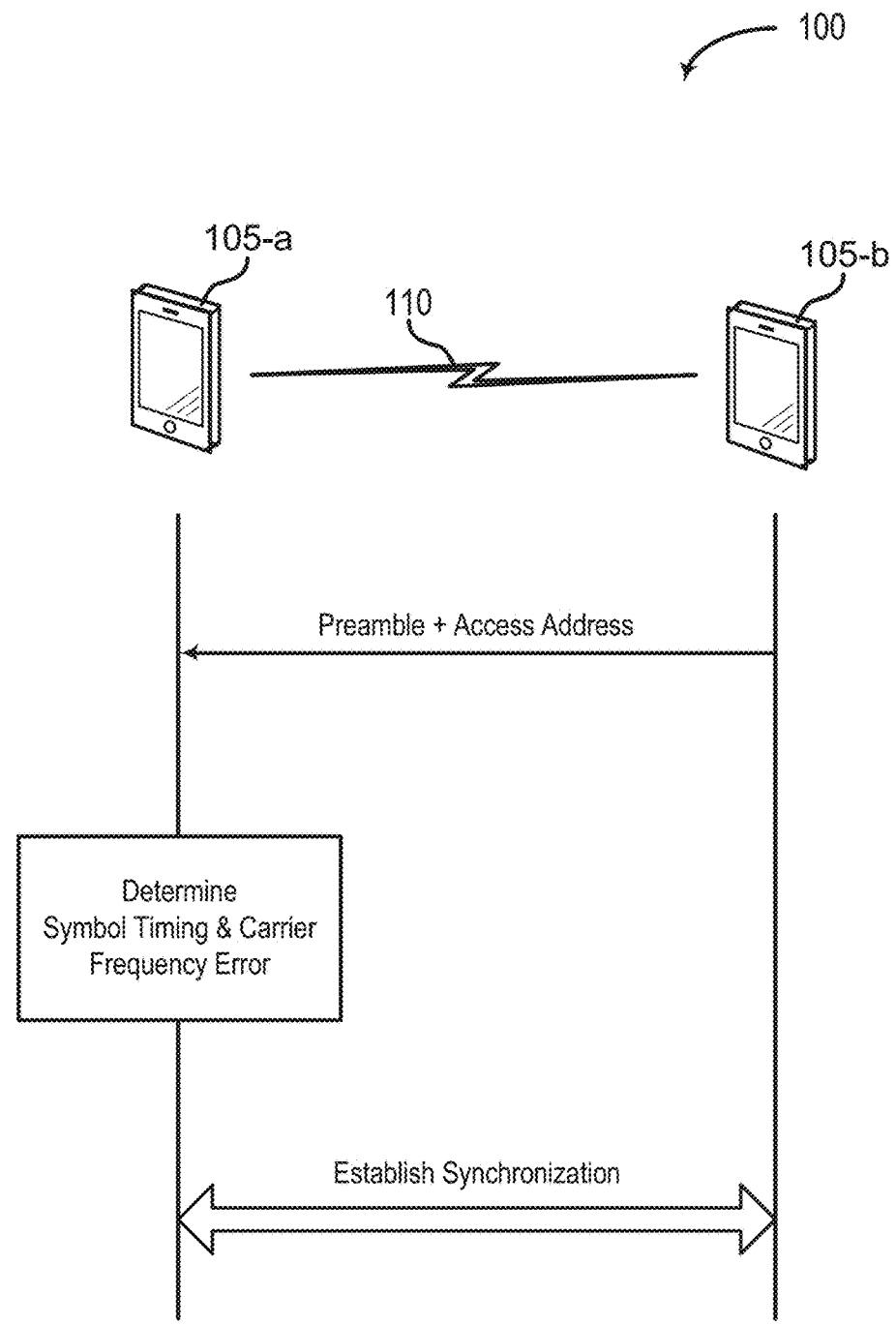
FIG. 1 shows an example of a communications system according to aspects of the present disclosure.

Communications systems (e.g., wireless communications systems) are deployed to provide various communication services such as data services, video services, audio services, messaging services, telecommunication services, broadcast services, etc. Communications systems may employ various technologies according to certain protocols to support communications between devices (e.g., to make communications compatible between various devices, to share available system resources efficiently, etc.). For example, Bluetooth radio packet formats (e.g., both standard Bluetooth and Bluetooth low-energy (BLE) packet formats) may include a short preamble followed by a device's Access Address (e.g., in BLE) or a device's Sync Word (e.g., in Basic Rate (BR)/Enhanced Data Rate (EDR)). The Access Address or Sync Word (e.g., which both may generally be referred to as Access Address herein, unless just BR/EDR is being described) is generally used to establish information about the incoming packets. For instance, the Access Address or Sync Word may be used by a receiving device to establish information of incoming packets from a transmitting device, including symbol timing, carrier frequency error (or offset), and identification for the receiving device (i.e. it has the correct Access Address).

Confirmation of the Access Address relies on accurate knowledge of the symbol timing and carrier frequency error. However, estimating either symbol timing or carrier frequency error may be difficult without knowledge of the other. Thus, the information being extracted from the Access Address is considerable and the effective methods of joint detection may be desired. Such may be particularly important in certain systems, for example, such as BLE systems. For instance, BLE communications may be sensitive to errors (e.g., with the Access Address comprising 32 bits, reduced from 64 bits in other Bluetooth systems). In some cases, all 32 bits of an Access Address must be demodulated correctly (e.g., as an Access Addresses can be just 1 bit different from that of another device). Therefore, inaccuracies in carrier frequency error estimation may lead to decoding errors, packet loss, etc. (e.g., even if one bit of an Access Address is incorrectly demodulated, for instance, due to insufficient knowledge of the symbol timing and carrier frequency error).

For instance, carrier frequency error may be present because a receiving device has a different crystal for its frequency reference to that of a transmitting device. A crystal oscillator is a device that typically employs an amplifier and a crystal to generate a fixed frequency signal (e.g., based on the intrinsic frequency of a piezoelectric crystal resonator). Thus, due to usage of different crystals for frequency reference, the local oscillator frequencies between two communicating devices (e.g., between the receiving device and the transmitting device) may not match. Accordingly, some receivers (e.g., some Bluetooth receivers) may struggle to receive packets of large carrier frequency error, especially for packets with low signal-to-noise ratio (SNR). Bluetooth RF specifications may call for tests using packets with large frequency errors, which may lead to degraded sensitivity. Furthermore, some receivers may have issues interfacing with certain devices (e.g., cheaply manufactured Bluetooth devices) that may not conform even to the very relaxed BLE specification (e.g., which may lead to synchronization issues between communication devices, poor performance, etc.).

Solutions to the joint detection problem rely on making a good estimate of the carrier frequency error in order to ease the estimation of the symbol timing and demodulation of the Access Address. Performing such estimations may be expensive (in terms of gates), inaccurate for low signal-to-noise ratio (SNR), or both. The estimation of the carrier frequency error may be performed on the preamble, which precedes the Access Address. It may be expensive to implement a frequency estimation structure with a large capture range (e.g., due to limited, or shortened, preambles, for example, that may be associated with BLE communication protocols).

According to the systems and techniques described herein, an efficient frequency estimation structure (e.g., a zero crossing minimum/maximum (min/max) structure) may be implemented, where the capture range (e.g., the capture range of carrier frequency offset error determination) is extended by running a bank of limited capture range structures, where each stream trials different (large) frequency errors. In some aspects, a set of frequency offset estimation circuits and a set of correlation circuits (e.g., 1-bit correlators) may be used on parallel streams to perform correlation operations on each branch of a received bit stream to determine correlations with known preamble patterns (e.g., to accurately estimate large carrier frequency offset errors). Such techniques may be relatively easy and inexpensive to implement (e.g., as implementations may be relatively small in gate count, etc.). Moreover, the described techniques may thus effectively ease the estimation of symbol timing and improve demodulation (e.g., of Access Addresses), which may result in more successful synchronization procedures, more reliable communications between devices, etc.

FIG. 1 shows an example of a communications system 100 according to aspects of the present disclosure. In one aspect, communications system 100 includes communications devices 105 and communications link 110. In some aspects, communications device 105-a may include or refer to a receiving device, a receiver, etc., and communications device 105-b may include or refer to a transmitting device, a transmitter, etc. For instance, in the example of FIG. 1, device 105-a may receive a signal (e.g., a signal including a preamble and an Access Address, such as a BLE signal) and determine symbol timing and carrier frequency error, according to techniques described in more detail herein. The symbol timing and carrier frequency error may be determined by device 105-a for synchronization with device 105-b (e.g., to establish information of incoming packets from a transmitting device 105-b, including symbol timing, carrier frequency error, identification or correct Access Address, etc.).

In some aspects, communications device 105-a is an example of, or includes aspects of, the corresponding communications device described with reference to FIG. 2. Moreover, in some examples, communications device 105-b may include devices that loosely adhere, or do not adhere, to certain protocols and specifications (e.g., BLE frequency error specifications). In other words, device 105-b may include devices with crystal references outside of typical ranges assumed by communications device 105-a for engaging in communications. For instance, in one example, communications device 105-b may be a cheaply, or poorly, manufactured device including low cost components, such as a low cost oscillator that does not adhere to BLE frequency error specifications. In some cases, device 105-b may be from, or may be manufactured in, certain geographical regions using crystal oscillator materials with properties having certain characteristics, may be manufactured using cheap components including cheap oscillators, etc.

The techniques and systems described in more detail herein may be implemented to improve communications between devices (e.g., such as between device 105-a and device 105-b). For instance, communications device 105-a may employ one or more aspects of described frequency estimation structures and techniques, for example, where a zero crossing min/max structure may be implemented with a bank (e.g., a set) of limited capture range structures trialing different large frequency errors. In some aspects, a set of correlation circuits (e.g., 1-bit correlators) may be used to perform correlation operations on each branch of a received bit stream to determine correlations with known preamble patterns (e.g., to accurately estimate large frequency errors that may be associated with communications device 105-b, to efficiently establish synchronization with communications device 105-b, to generally improve the throughput and reliability of communications system 100, etc.).

Generally, communications system 100 (e.g., a wireless communications system 100) may be deployed to provide various communication services between communications devices 105, such as data services, video services, audio services, messaging services, telecommunication services, broadcast services, etc. Communications devices 105 may generally include any computing devices suitable for performing communication operations, such as personal computers, laptop computers, mainframe computers, palmtop computers, personal assistants, mobile devices, wearable devices, speakers, microphones, Internet of Things (IoT) devices, or any other suitable processing apparatuses.

A baseband signal may refer to a signal in a frequency band in which a signal is generated. In some cases, a communication device 105 may generate signals at one frequency (e.g., a relatively low frequency) and then transmit and receive signals at another frequency (e.g., a relatively high frequency). The frequency at which the signal is generated (or processed by the receiver) is sometimes known as the baseband frequency, while the transmission frequency (or reception frequency) may be known as the radio frequency (e.g., as a radio frequency (RF)-band signal). In some cases, the signals at one frequency (e.g., the transmission frequency) may be converted to another frequency (e.g., the baseband frequency) by combining the received frequency with another signal and filtering the result. Further, signals received at one frequency (e.g., a reception frequency) may be converted to another frequency (e.g., the baseband frequency) for reception operations. In some cases, as described in more detail herein, large frequency errors may be associated with reception frequency (e.g., due to differences in local crystal oscillator references between communicating devices, such as between communications device 105-*a* and a potentially non-complaint, or loosely compliant, communications device 105-*b*).

During transmission operations (e.g., during implementation of modulation schemes), a bit stream to be modulated may be divided into n-bit sequences, and each n-bit sequence may be represented by a specific phase shift mapped to the binary code of the n-bit sequence. For example, a $2^n$ phase shift keying (PSK) scheme may map n-bit codes to $2n$ phase shifts. For instance, in an 8PSK system, eight 3-bit sequences are each mapped to a different phase shift (e.g., sequences of 000, 001 . . . 110, 111 may be represented by phase shifts of 0, pi/4 . . . pi, −3pi/4). Each phase shift may be represented as coordinates in an I-Q (In-phase-Quadrature) plane, where I is the abscissa and Q is the ordinate of the IQ plane. Meanwhile, a quality metric used for PSK modulation is Error Vector Magnitude (EVM), which is a measure of how far actual IQ constellation points deviate from their ideal locations. In some aspects, such phase shift keying techniques may be employed for transmission payloads (e.g., EDR payloads), and other shift keying techniques, such as Gaussian frequency-shift keying (GFSK) may be employed for the preamble and Access Address.

In a cartesian modulator, separate I and Q signals of the IQ pairs are generated and applied to individual mixers. At the receiver, the I and Q signals are recovered and used to obtain the n-bit sequences (e.g., the original n-bit bit stream generated by the transmitting device).

In some cases, a "zero-crossing" event in IQ space may occur in which an IQ trajectory passes through (or very close to) the origin of the IQ coordinate system (e.g., which may result in higher bit errors on the receive side). Some wireless protocols have narrow channels that make it difficult to tolerate wide FM modulation. Bluetooth is one such example, where a Bluetooth EDR (Enhanced Data Rate) 3 packet may use 8PSK modulation and the channels are 1 MHz wide.

In some cases, a basic FM demodulator may differentiate the phase of the signal to get frequency (e.g., and the frequency may deviate up and down to follow the bit pattern of the signal). In some aspects, if the Lo's are aligned this frequency will cross 0 (e.g., which may be referred to as a zero crossing), for instance, where $$\text{Frequency} = \frac{d\varphi}{dt} = 0.$$

A carrier signal is a modulated carrier, which is a band-limited signal containing spectral energy over a band encompassing the carrier frequency. As described herein, confirmation of the Access Address (e.g., for synchronization operations between communication devices 105, such as BLE) relies on accurate knowledge of the symbol timing and carrier frequency error. Carrier frequency error (e.g., inaccuracies in carrier frequency error estimation) may be present because a receiving device has a different crystal for its frequency reference to that of a transmitting device. Thus, the local oscillator frequencies between two communicating devices (e.g., between the receiving device and the transmitting device) may not match. Any crystal may have a tolerance on its frequency accuracy (e.g., typically larger for less expensive crystals). For Bluetooth devices (e.g., for BLE devices designed to be implemented relatively cheaply), communications systems (e.g., BLE standards) may allow, for example, a crystal accuracy of ±50 ppm. In such an example, a crystal accuracy of ±50 ppm equates to ±150 kHz of carrier frequency error in a device. As a receiving device's crystal may also have a frequency error of the opposite sign, carrier frequency errors of, for example, ~250 kHz may be expected. Gaussian pulse shaping of a 10101010 sequence may have a deviation of ±220 kHz (e.g., resulting in possible carrier frequency errors that are a substantial fraction of the GFSK frequency deviation). Such may lead to decoding errors, packet loss, etc. (e.g., even if one bit of an Access Address is incorrectly demodulated, for instance, due to insufficient knowledge of the symbol timing and carrier frequency error).

In some cases, as used in some examples herein, Access Code may refer to a combined structure of a preamble and Sync Word (e.g., in BR/EDR). In some aspects, an Access Code may include, for example, 72 bits, including a 4 bit preamble, a 64 bit Sync Word, and a 4 bit trailer. In some cases, for BLE, a signal may include a preamble (e.g., an 8 bit preamble or a 16 bit preamble), follow by an Access Address of 32 bits, for example.

Figure 2:
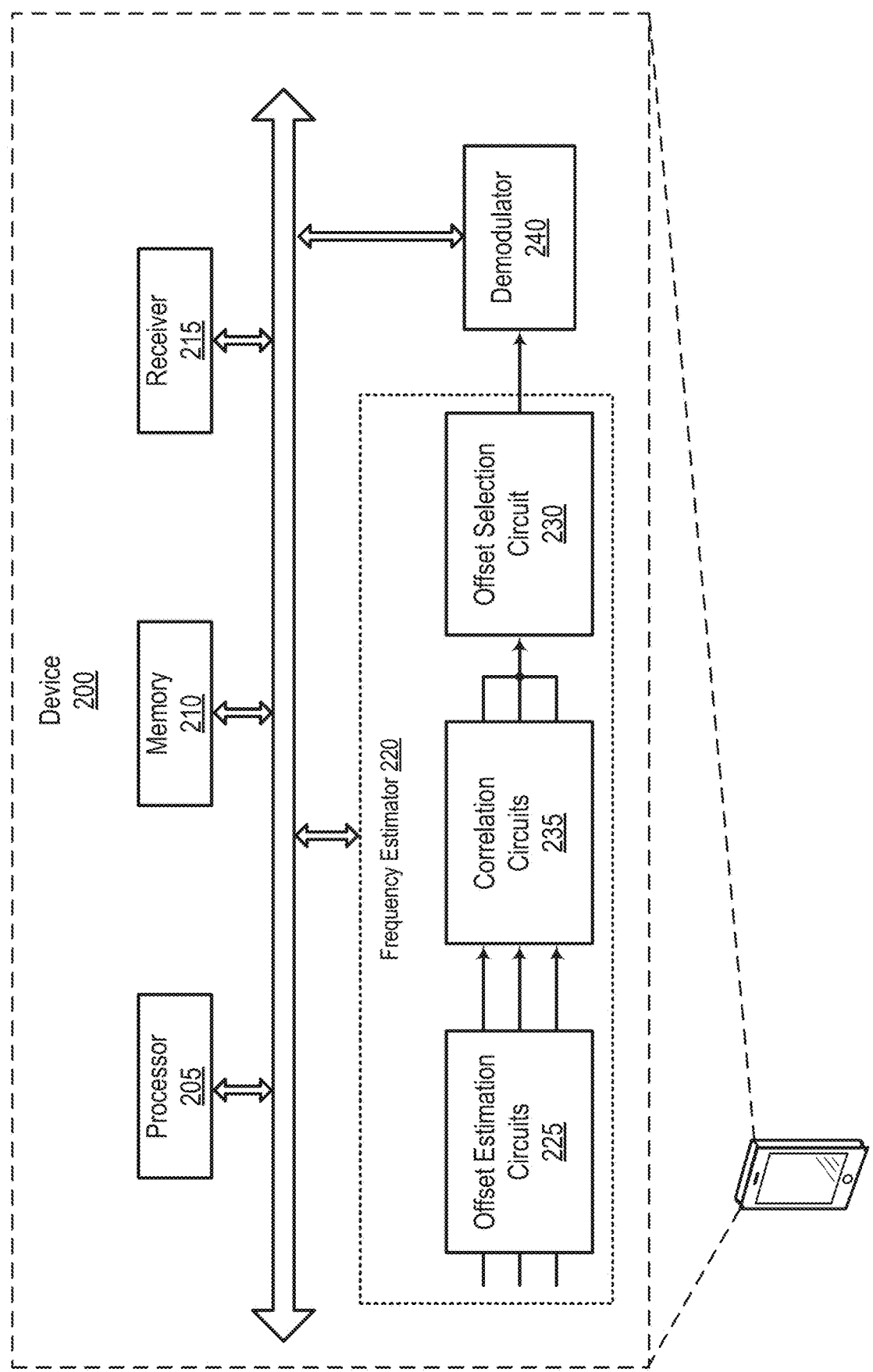
FIG. 2 shows an example of a communications device according to aspects of the present disclosure.

FIG. 2 shows an example of a communications device 200 according to aspects of the present disclosure. Communications device 200 is an example of, or includes aspects of, the corresponding element described with reference to FIG. 1. In one aspect, communications device 200 includes processor 205, memory 210, receiver 215, frequency estimator 220, and demodulator 240. In one aspect, frequency estimator 220 includes frequency offset estimation circuits 225, offset selection circuit 230, and correlation circuits 235.

Communications device 200 may receive signals from, and engage in communications with, other communications devices. In some examples, signals between devices (e.g., signals exchanged prior to, or as a part of, a synchronization procedure) may include information to establish information about future incoming signals (e.g., such as, in Bluetooth examples, a preamble followed by a synchronization address or synchronization word). As described herein, accurate estimation of symbol timing and carrier frequency offset error may play an important role in whether communications device 200 is able to successfully synchronize with, and communicate with, another communications device in a communications system.

Accordingly, apparatuses and systems for carrier frequency error estimation using a bank of estimators with limited acquisition range are described. An apparatus and/or a system according to the present disclosure may include a receiver 215 and a frequency estimator 220 (e.g., the frequency estimator 220 including at least a plurality of frequency offset estimation circuits 225 and an offset selection circuit 230). The receiver 215 may be configured to receive a signal. The plurality of frequency offset estimation circuits 225 may be configured to estimate a plurality of frequency offsets for the signal. In some aspects, each of the plurality of frequency offset estimation circuits 225 may operate based on a different baseline frequency from a plurality baseline frequencies. The offset selection circuit 230 may be configured to select a baseline frequency and a frequency offset from the plurality of frequency offsets.

In some examples, the communications device 200 further includes a demodulator 240 configured to demodulate the signal based on the selected frequency offset. In some examples, the communications device 200 (e.g., the frequency estimator 220) further includes a plurality of correlation circuits 235 configured to perform a correlation operation on the signal. In some aspects, each of the plurality of correlation circuits 235 may obtain a correlation value for a corresponding frequency offset of the plurality of frequency offsets.

In some examples, the plurality of frequency offset estimation circuits 225 may be configured to perform a zero-crossing min-max operation on the signal (e.g., the received signal) based on a corresponding baseline frequency of the plurality of baseline frequencies. One or more aspects of such zero-crossing min-max operations are described in more detail herein, for example, with reference to FIG. 3).

A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by the modem.

A receiver 215 may receive information such as packets, user data, or control information associated with various information channels (e.g., control channels, data channels, etc.). Information received at a receiver 215 may be passed on to other components of the device, such as a communication processor 205. In some cases, receiver 215 may be an example of aspects of a transceiver. In various examples, receiver 215 may utilize a single antenna or a plurality of antennas.

A processor 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 205 is configured to operate a memory 210 array using a memory 210 controller. In other cases, a memory 210 controller is integrated into the processor 205. In some cases, the processor 205 is configured to execute computer-readable instructions stored in a memory 210 to perform various functions. In some embodiments, a processor 205 includes special purpose components for modem processing, baseband processing, digital signal processing, or transmission processing.

Examples of a memory 210 device include random access memory (RAM), read-only memory (ROM), or a hard disk. Examples of memory 210 devices include solid state memory 210 and a hard disk drive. In some examples, memory 210 is used to store computer-readable, computer-executable software including instructions that, when executed, cause a processor 205 to perform various functions described herein. In some cases, the memory 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 210 store information in the form of a logical state.

In some aspects, communications device 200 may include a modem. A modem may perform functions related to modulation and demodulation of communication signals.

In some aspects, communications device 200 may include a transmitter. A transmitter may transmit signals generated by other components. Information sent by a transmitter may be received from other components of the device, such as a communication processor 205. In some cases, transmitter may be an example of aspects of a transceiver. In various examples, transmitter may utilize a single antenna or a plurality of antennas.

In some aspects, communications device 200 may include software. Generally, software may include code to implement aspects of the present disclosure. Software may be stored in a non-transitory computer-readable medium such as system memory 210 or other memory 210. In some cases, the software may not be directly executable by the processor 205 but may cause a computer (e.g., when compiled and executed) to perform functions described herein.

According to some aspects, frequency estimator 220 identifies a set of baseline frequencies. In some examples, frequency estimator 220 identifies a first baseline frequency corresponding to an unmodified baseline frequency of the receiver. In some examples, frequency estimator 220 identifies a second bassline frequency that is higher than the first baseline frequency. In some examples, frequency estimator 220 identifies a third baseline frequency that is lower than the first baseline frequency, where the set of baseline frequencies includes the first baseline frequency, the second baseline frequency and the third baseline frequency. In some aspects, an absolute difference between the first baseline frequency and the second baseline frequency is equal to an absolute difference between the first baseline frequency and the third baseline frequency. In some examples, frequency estimator 220 selects the set of baseline frequencies based on a historical distribution of frequency offsets. In some examples, frequency estimator 220 converts the signal to a phase representation (e.g., in some aspects, a phase conversion component, described with reference to FIGS. 3 and 4, may convert the signal to a phase representation). In some examples, frequency estimator 220 increments a phase difference of the signal to obtain a set of phase signals corresponding set of baseline frequencies (e.g., in some aspects, a phase to frequency component, described with reference to FIGS. 3 and 4, may increments a phase difference of the signal to obtain a set of phase signals corresponding set of baseline frequencies). For instance, phase may be the integral of the frequency. As such, the phase difference applied may increment each clock cycle (e.g., though the phase, or a phase representation, may be differentiated to get frequency and apply the frequency error). Frequency estimator 220 is an example of, or includes aspects of, the corresponding element described with reference to FIGS. 3 and 4.

According to some aspects, frequency offset estimation circuits 225 estimate a set of frequency offsets for a signal, where each of the set of frequency offsets corresponds to a baseline frequency of the set baseline frequencies. In some examples, frequency offset estimation circuits 225 perform a zero-crossing min-max operation on the signal based on each of the set of baseline frequencies, where the set of frequency offsets are estimated based on the zero-crossing min-max operation. Frequency offset estimation circuits 225 are examples of, or include aspects of, the corresponding elements described with reference to FIGS. 3 and 4.

According to some aspects, offset selection circuit 230 selects a frequency offset from the set of frequency offsets. In some examples, offset selection circuit 230 computes a first frequency offset first from among the set of frequency offsets before computing other frequency offsets of the set of frequency offsets, where the frequency offset is selected based on computing the first frequency offset first. In some examples, offset selection circuit 230 identifies a waiting time. In some examples, offset selection circuit 230 waits for a second frequency offset after receiving the first frequency offset based on the waiting time. Offset selection circuit 230 is an example of, or includes aspects of, the corresponding element described with reference to FIGS. 3 and 4.

According to some aspects, correlation circuits 235 perform a correlation operation on the signal for each of the set of frequency offsets to obtain a correlation value corresponding to each of the set of frequency offsets, where the frequency offset is selected based on the correlation value. In some examples, correlation circuits 235 identify a highest correlation value among the correlation values corresponding to the set of frequency offsets, where the frequency offset is selected based on the highest correlation value. In some aspects, the correlation operation is performed on a preamble of the signal. In some examples, the correlation operation may be extended to be performed on some bits (e.g., the first few bits) of the Sync Word (e.g., for BR Bluetooth). For instance, such may be implemented as BR has just a 4 bit preamble, and such correlation operations may be possible as a hamming distance between sync words for BR may have a couple of bit errors, in some examples). In some aspects, the correlation operation is performed on an Access Address, an access word, or a sync word of the signal. Correlation circuits 235 are examples of, or include aspects of, the corresponding elements described with reference to FIGS. 3 and 4.

According to some aspects, demodulator 240 demodulates the signal using the selected frequency offset. In some aspects, the signal includes a Bluetooth Low Energy (BLE) signal. Demodulator 240 is an example of, or includes aspects of, the corresponding element described with reference to FIGS. 3 and 4.

According to some aspects, frequency estimator 220 identifies a set of baseline frequencies. In some examples, frequency estimator 220 selects a set of sample sets from a signal, where each of the samples sets corresponds to one of the set of baseline frequencies. In some examples, frequency offset estimation circuits 225 detect a zero crossing point corresponding to each of the set of baseline frequencies based on the corresponding sample set. In some examples, frequency offset estimation circuits 225 estimate a frequency offset for each of the set of baseline frequencies based on the corresponding zero crossing point. In some examples, offset selection circuit 230 selects the frequency offset corresponding to a highest correlation value for demodulating the signal. In some examples, correlation circuits 235 perform correlation operations on the signal based on the frequency offset to obtain the correlation value. In some examples, demodulator 240 demodulates the signal using the selected frequency offset.

Figure 3:
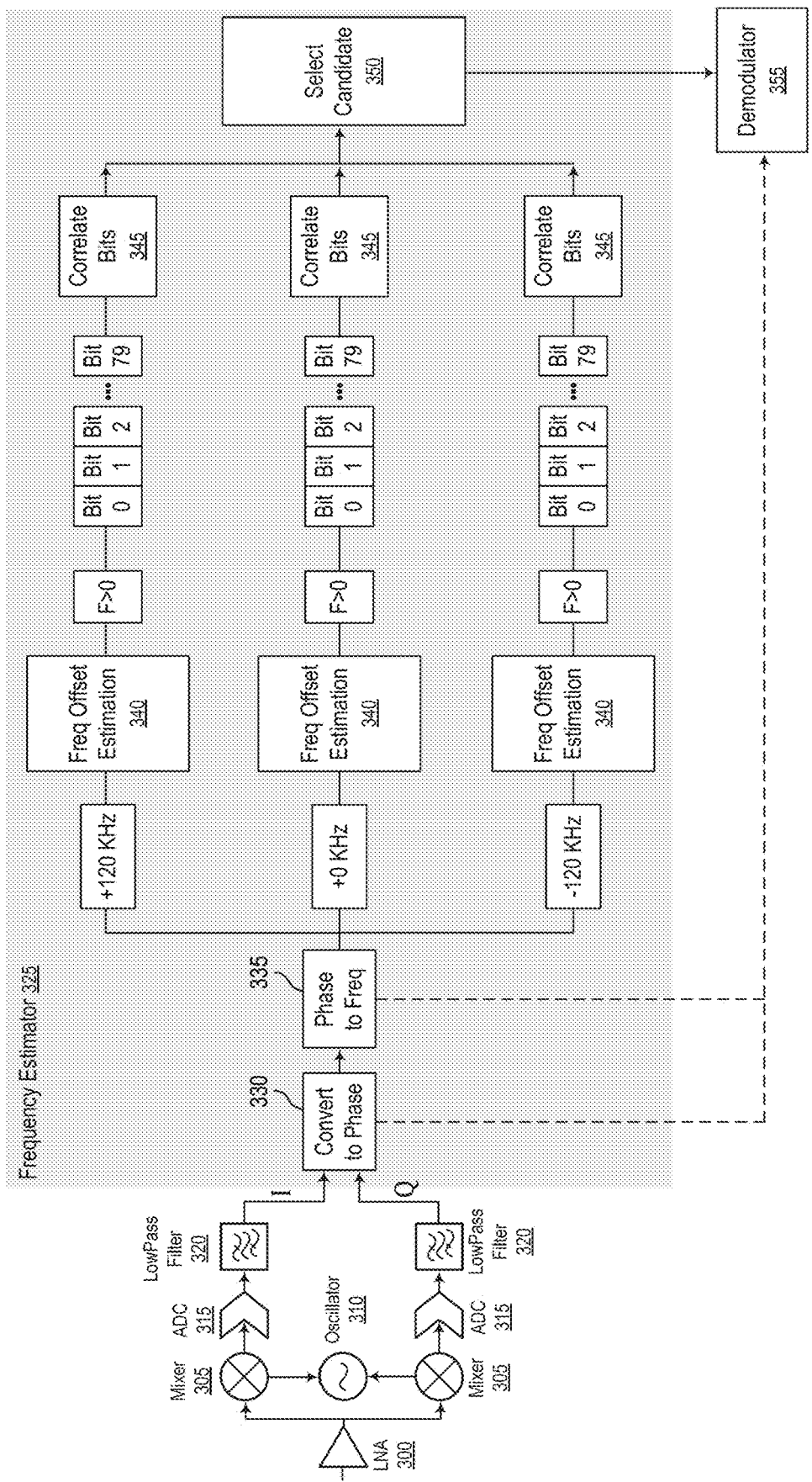
FIGS. 3 and 4 show examples of processing architectures according to aspects of the present disclosure.

FIG. 3 shows an example of a processing architecture according to aspects of the present disclosure. The example shown includes LNA 300, mixers 305, oscillator 310, ADCs 315, low pass filters 320, frequency estimator 325, and demodulator 355. Frequency estimator 325 is an example of, or includes aspects of, the corresponding element described with reference to FIGS. 2 and 4. In one aspect, frequency estimator 325 includes phase conversion component 330, phase to frequency component 335, frequency offset estimation circuits 340, correlation circuits 345, and offset selection circuit 350.

In some implementations a carrier frequency estimator may include a min/max detector, for example, which may use a zero frequency crossing to separate the maxima and minima (e.g., which may be referred to as a min/max operation). For instance, a fixed number of maxima and minima may be stored in one or more buffers (i.e. 4 maxima and 4 minima), and the carrier frequency error may be determined based on the average value over the one or more buffers. The maxima and minima may be determined by a zero crossing detection. In some cases, the FM demodulation of the preamble and Access Address of a BLE packet (on which the estimator may operate using the simple zero crossing algorithm) when carrier frequency error is large may result in challenges due to noise creating zero crossings that should not be present, or due to noise removing zero crossings that should be present.

In some implementations, min/max estimator techniques may be complemented by employing a bank of correlator's trialing different frequency errors (e.g., which may improve carrier frequency estimation compared to other conventional standalone min/max estimator techniques). However, due to limited capture ranges associated with each branch, a prohibitive number of branches may be demanded in order to extend the performance of carrier frequency estimation desired for very high offset use cases (e.g., for out of specification devices).

According to the systems and techniques described herein, frequency estimator 325 may employ a min/max estimator after correcting for different frequency error candidates, which may significantly reduce the number of branches while providing a wider capture range.

The example of FIG. 3 shows one or more aspects of implementing multiple branches of frequency offset estimation circuits followed by correlation circuits, each set at different frequency offsets to search for a pattern (e.g., such as to search for a Preamble bit pattern, which may be used at least in part for improved carrier frequency offset error estimation, for accurate Access Address determination, for improved synchronization operations between communications devices, etc.). For instance, in the example of FIG. 3, frequency estimator 325 includes frequency offset estimation circuits 340 followed by correlation circuits 345 used to select a candidate (e.g., via offset selection circuitry 350) if correlation of a branch exceeds a threshold (e.g., or to select a middle branch if multiple correlators, or multiple correlation circuits, have a same value).

According to one or more aspects described herein, the correlators (e.g., correlation circuits 345) may include single bit correlators, which may be relatively cheaper to implement for such frequency offset error estimation schemes (e.g., compared to other less efficient schemes using one or more multiple bit correlators). If the bit pattern of the preamble is matched by a correlation circuit 345 of a particular branch, the frequency error of that correlator (e.g., of that correlation circuit 345) may be used, for example, for the Access Address check. As described herein, such may enable an extended frequency offset error capture range by a communications device implementing such techniques and systems, via the running of the bank limited capture range structures trialing different large frequency errors).

In some aspects, the techniques described herein perform a correlation on the preamble of a signal (e.g., such as correlation on the preamble of a BLE signal). In some aspects, the described techniques may not attempt packet detection or an estimation of symbol timing. Instead, the systems and techniques described may trial multiple frequency error candidates simultaneously through multiple correlators (e.g., through correlation circuits 345, which, in some cases, may include 1-bit correlators). A successful match (e.g., a correlation result exceeding a threshold) may be used to select a frequency error candidate (e.g., a best frequency error candidate). Generally, correlation operations described herein may be performed on the Access Address or a Preamble, among other examples.

In some aspects, FIG. 3 (e.g., as well as FIG. 4) may illustrate one or more aspects of a receiver processing architecture (e.g., a processing architecture employed by a communications device receiving a signal, such as a BLE signal) that may implement one or more aspects of the techniques described herein. In some cases, FIGS. 3 and 4 be implemented by a direct conversion receiver. However, aspects of the techniques described herein are not limited thereto, and other architectures implementing aspects of the described techniques may be implemented by analogy, without departing from the scope of the present disclosure.

The LNA 300 may receive a signal (e.g., a signal in the 2.4-2.48 GHz ISM band). The signal may be amplified, via LNA 300, and down converted. In some examples, the signal may then be digitized, and low pass filtered via a filter (e.g., a filter wide enough to allow the signal through including any carrier frequency offset, such as a 1.3 MHz width filter, in some examples). In some cases, the received signal is mixed (e.g., via mixers 305) at a nominal channel frequency of the transmission (e.g., of the transmission frequency from a transmitting device). In some cases, such may be achieved over, for example, 2 mixing processes (e.g., first over an intermediate frequency (IF) process, followed by another mixing process to down convert to baseband, and to be potentially performed in the digital domain)).

Figure 7:
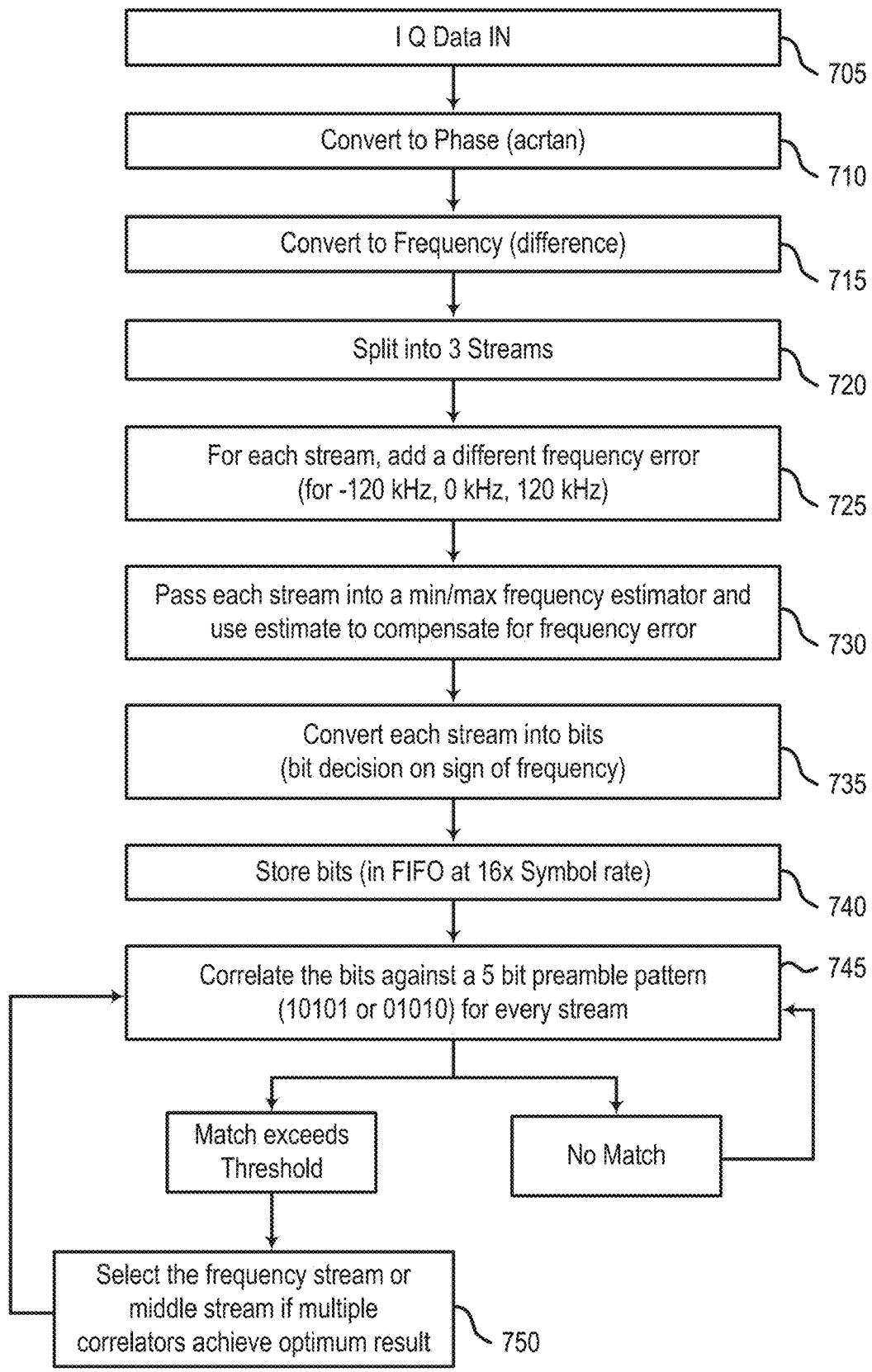
FIG. 7 shows an example process for frequency estimation and preamble correlation according to aspects of the present disclosure.

One or more aspects of operations performed via frequency estimator 325 may be further described herein, for example, with reference to FIG. 7. For instance, IQ samples may be converted to phase (e.g., via phase conversion component 330). This phase may then be differenced to give a frequency (FM demodulation), via a phase to frequency component 335. For instance, frequency estimator 325 may implement parallel processing, as 3 carrier frequency error candidates are processed (e.g., in the example of FIG. 3). On each stream (or branch), a different frequency error may be added. In the example of FIG. 3, a granularity of 120 kHz is used, giving 3 streams (although other implementations are considered by analogy, without departing from the scope of the present disclosure). For instance, additional streams (e.g., with a finer resolution), or fewer streams (e.g., with coarser resolution), etc., may be implemented, based on, for example, desired performance implications.

In some aspects, the FM demodulation may be passed into a "Min/Max" frequency offset estimator. A "Min/Max" estimator may attempt to capture the peaks and troughs of the incoming signal via calculation operations and estimation operations. The resultant frequency offset may be determined (e.g., or estimated) to be the midpoint between the identified peaks and troughs. In the example of FIG. 3, the system (e.g., the frequency estimator 325) may include 3 (or more) Min/Max frequency estimators (e.g., 3 frequency offset estimation circuits) sitting in parallel at 3 different frequency offsets, and each estimator may cover a range of 120 KHz. It should be noted that FIG. 3 shows and example processing system for illustrative purposes, and is not intended to be limiting in terms of the scope of the present disclosure (e.g., other numbers of parallel streams/ frequency offset estimation circuits 340, as well as other cover ranges associated with each stream/frequency offset estimation circuit 340, are possible by analogy, without departing from the scope of the present disclosure).

Referring back to the example of FIG. 3, each of the estimators (e.g., each frequency offset estimation circuit 340) covers a range of +180 KHz to +60 KHz, +60 KHz to −60 KHz and −60 KHz to −180 KHz respectively. Overall, the 3 frequency offset estimation circuits 340 together may cover a total range of, for example, +180 KHz to −180 KHz. In some examples, the frequency range coverage of each frequency offset estimation circuit 340 may be much greater than 120 KHz, and hence there may be considerable overlap of range between the 3 frequency offset estimation circuits 340. Consequently, the actual range of the 3 frequency offset estimation circuits 340 working in parallel may be more like, for example, +200 KHz to −200 KHz. After the Min/Max estimator (e.g., after the frequency offset estimation circuits 340), the processing may continue with correlation circuits 345 (e.g., in order to determine correlations with known preamble patterns, to accurately estimate carrier frequency offset error associated with the signal, etc.).

In some examples, the FM demodulation may then be converted to bits (e.g., after processing via frequency offset estimation circuits 340). In some cases, the FM demodulation may be converted to bits by assigning a 1 if the frequency is greater than 0 and by assigning 0 if the frequency is less than 0. This data (e.g., the bits) may then be stored (e.g., buffered in a first in first out (FIFO) buffer), which is then compared against the 10101 or 01010 pattern. In some aspects, this short 5 bit pattern may be chosen such that one or more aspects of the described techniques may be used unchanged for either BR or BLE. For instance, Bluetooth has 4 bit preamble, however the first bit of the Sync word may be the opposite to the last bit of the preamble, allowing the use of this 5 bit pattern. The data (e.g., in this example) may be 16 times oversampled, as such every 16th sample may be compared against the 5 bit pattern. In some aspects, for a short pattern, a correlation may be oversampled (e.g., to reduce vulnerability to noise giving a false correlation). In some cases (e.g., when the correlation is on the whole Access Address), correlation may be performed on the sample rate.

In order to determine a correlation, or a match, the match may be determined as exceeding a threshold (e.g., as determined via correlation circuits 345 corresponding to the different parallel streams). If one or more of the streams correlators (e.g., if a correlation circuit 345 of a particular stream) determines this threshold has been exceeded, then that frequency error is selected. This determined carrier frequency offset error may then be used until another match exceeding the threshold is found. This updating of the frequency error for every exact match has the desired property that the carrier frequency offset estimate may not get stuck at a bad value (e.g., as can happen to min/max schemes before any RF signal arrives). In some aspects, if the bit pattern occurs again in the Access Address or Sync Word, then the carrier frequency offset estimate may be updated again during the demodulation of the Access Address or Sync Word. Such may not result in issues, as the correlators (e.g., the correlation circuits 345) may estimate the same carrier frequency offset error (or close to) from the second bit pattern match so the Access Address check may be unaffected. If multiple correlators exceed the match (e.g., if more than one correlation circuit 345 determines a correlation with a known pattern) then the middle correlator (e.g., the middle correlation circuit 345) in terms of the carrier frequency error may be selected. In the case of an even number of correlators achieving the result, then the lowest carrier frequency offset of the middle pair may be selected.

In some aspects, LNA 300 is an example of, or includes aspects of, the corresponding element described with reference to FIG. 4. Mixers 305 is an example of, or includes aspects of, the corresponding element described with reference to FIG. 4. Oscillator 310 is an example of, or includes aspects of, the corresponding element described with reference to FIG. 4. ADCs 315 is an example of, or includes aspects of, the corresponding element described with reference to FIG. 4. Low pass filters 320 is an example of, or includes aspects of, the corresponding element described with reference to FIG. 4.

Additionally (e.g., with regards to frequency estimator 325), phase conversion component 330 is an example of, or includes aspects of, the corresponding element described with reference to FIG. 4. Phase to frequency component 335 is an example of, or includes aspects of, the corresponding element described with reference to FIG. 4. Frequency offset estimation circuits 340 is an example of, or includes aspects of, the corresponding element described with reference to FIGS. 2 and 4. Correlation circuits 345 is an example of, or includes aspects of, the corresponding element described with reference to FIGS. 2 and 4. Offset selection circuit 350 is an example of, or includes aspects of, the corresponding element described with reference to FIGS. 2 and 4.

Moreover, demodulator 355 is an example of, or includes aspects of, the corresponding element described with reference to FIGS. 2 and 4.

Figure 4:
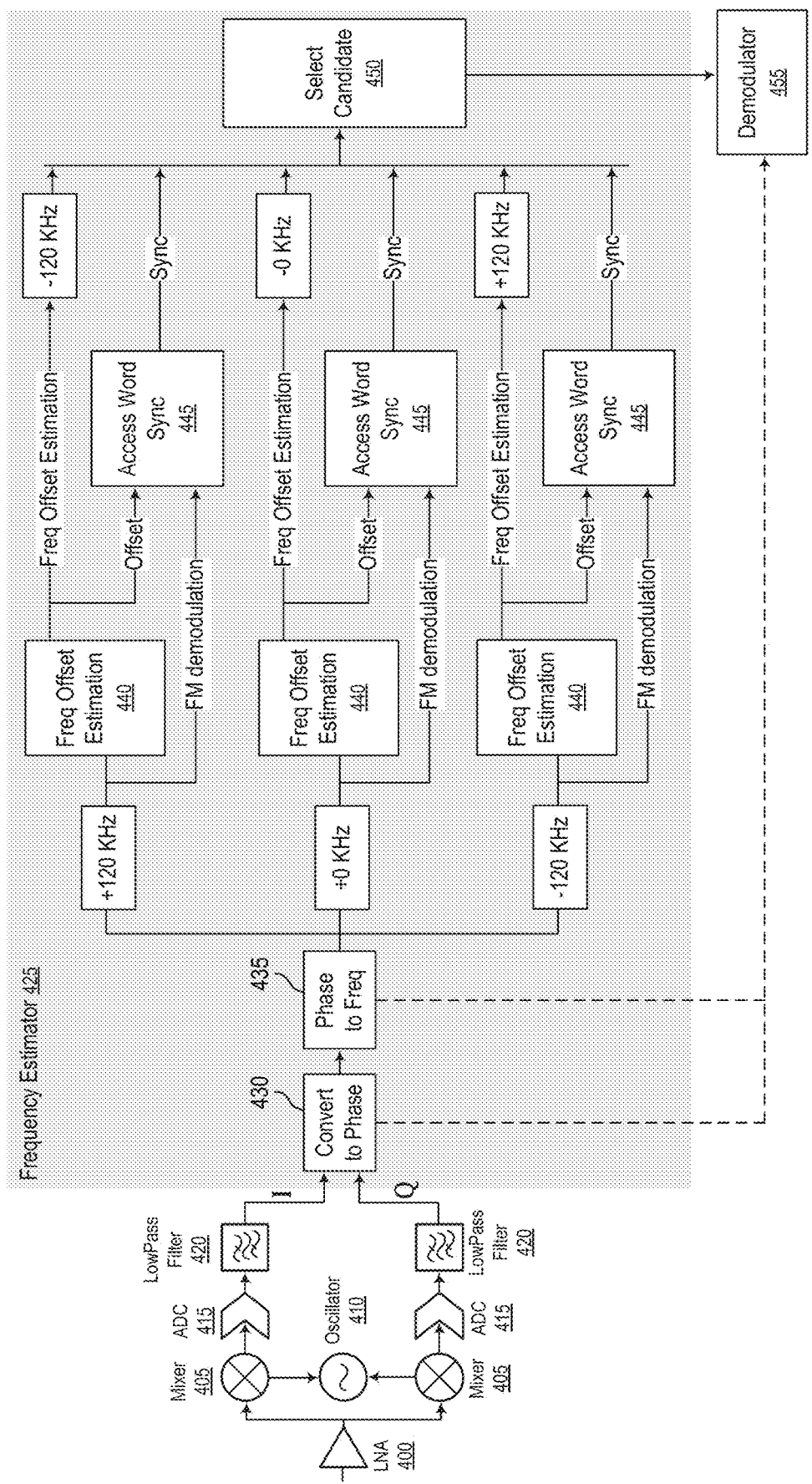

FIG. 4 shows an example of a processing architecture according to aspects of the present disclosure. The example shown includes LNA 400, mixers 405, oscillator 410, ADCs 415, low pass filters 420, frequency estimator 425, and demodulator 455. Frequency estimator 425 is an example of, or includes aspects of, the corresponding element described with reference to FIGS. 2 and 3. In one aspect, frequency estimator 425 includes phase conversion component 430, phase to frequency component 435, frequency offset estimation circuits 440, correlation circuits 445, and offset selection circuit 450.

The example of FIG. 4 shows one or more aspects of implementing multiple branches of frequency offset estimation circuits 440 followed by correlation circuits 445, each set at different frequency offsets to search for a pattern (e.g., such as to search for a Preamble bit pattern, which may be used at least in part for improved carrier frequency offset error estimation, for accurate Access Address determination, for improved synchronization operations between communications devices, etc.). For instance, in the example of FIG. 4, frequency estimator 425 includes frequency offset estimation circuits 440 followed by correlation circuits 445 used to select a candidate (e.g., via offset selection circuitry 450) if correlation of a branch exceeds a threshold (e.g., or to select a middle branch if multiple correlators, or multiple correlation circuits, have a same value).

According to one or more aspects described herein, the correlators (e.g., correlation circuits 445) may include single bit correlators, which may be relatively cheaper to implement for such frequency offset error estimation schemes (e.g., compared to other less efficient schemes using one or more multiple bit correlators). If the bit pattern of the preamble is matched by a correlation circuit 445 of a particular branch, the frequency error of that correlator (e.g., of that correlation circuit 445) may be used, for example, for the Access Address check and/or Access Word sync. As described herein, such may enable an extended frequency offset error capture range by a communications device implementing such techniques and systems, via the running of the bank limited capture range structures trialing different large frequency errors).

In some case, the processing system of FIG. 4 may use, for example, 16 samples per symbol. There are many choices for this number and the number of samples per symbol may be efficiently implemented at other numbers, for example, such as 8 or 4 samples per symbol. As described herein, other choices are possible for the number of correlation circuits 445 and the frequency granularity of the correlation circuits 445.

Figure 8:
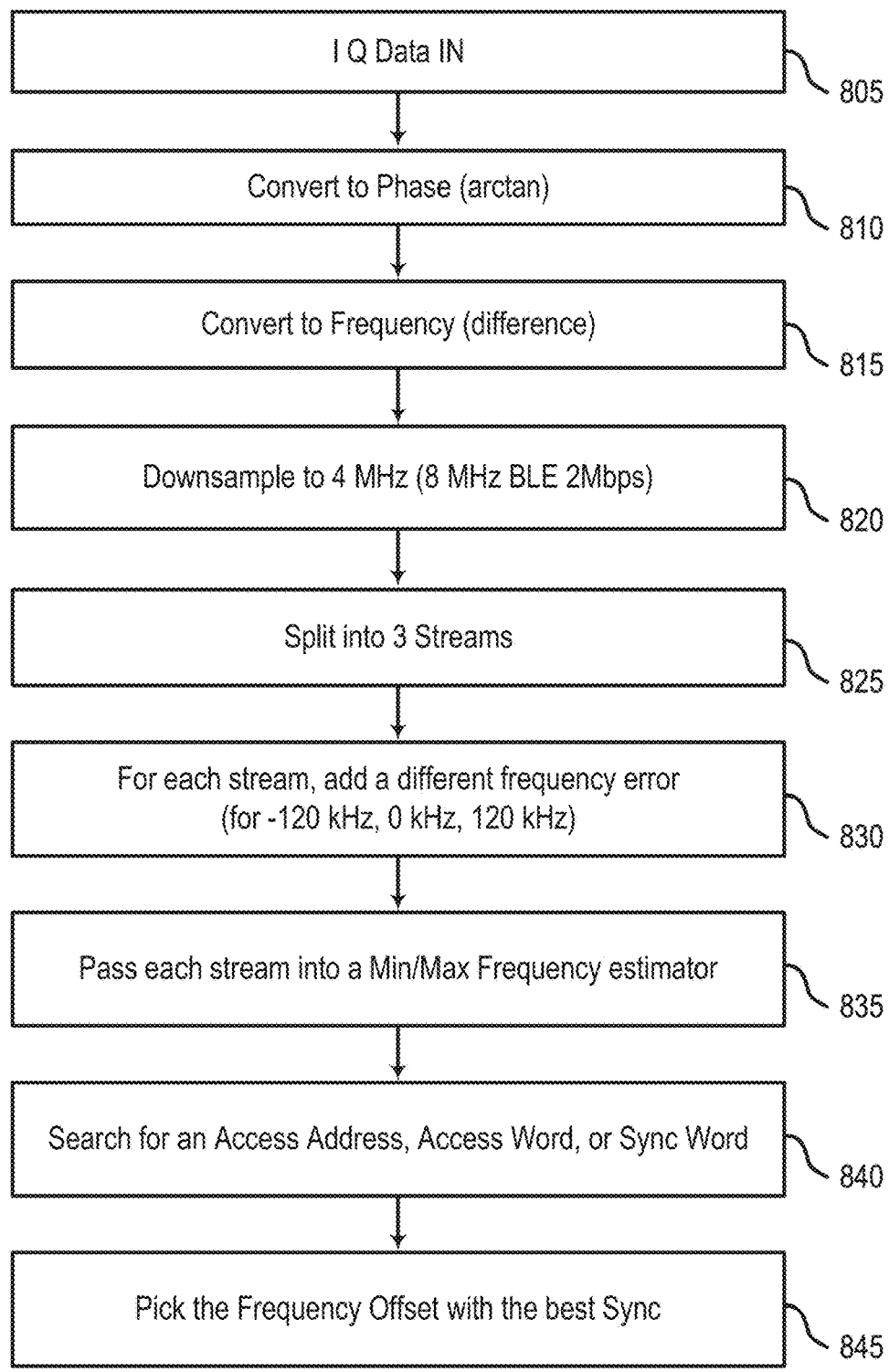
FIG. 8 shows example process for Access Address correlation according to aspects of the present disclosure.

One or more aspects of the techniques described herein may be extended to check the whole Access Address (e.g., or, for the BR case, to check the full sync word). Such techniques may make the performance more robust (e.g., via implementing larger correlations). For instance, one or more aspects of checking Access Word are shown in FIGS. 4 and 8. In such examples, the branches may not only provide a frequency estimate (e.g., via frequency offset estimation circuits 440), but the branches may also perform the correlation for the Access Address or Sync Word (e.g., via correlation circuits 445). Thus (e.g., in the example of FIG. 4) the 3 frequency offset estimation circuits 440 may generate 3 unique frequency offsets, where each frequency offset may be passed into a dedicated Synchronizer block. Synchronizer blocks may be responsible for searching for an Access Address or Sync Word. If a sync is detected (e.g., via one or more of the correlation circuits 445), then such detection may indicate that the Frequency offset estimation is approximately correct. If multiple Sync blocks detect a sync, then the sync block with the closest correlator match with the Access Address may be selected. The final frequency estimation may be calculated by subtracting the error introduced at the start of the chain.

Such embodiments of the present disclosure may increase the size of the correlation. By extending the length of the correlation, processing gain, and thus the performance, may be improved at low SNR. Additionally as the correlation is much longer, it is possible to run the correlation circuits 445 at lower number of samples per symbol (e.g., such as 4 in the example of FIG. 8), although many possible choices are possible by analogy, without departing from the scope of the present disclosure.

LNA 400 is an example of, or includes aspects of, the corresponding element described with reference to FIG. 3. Mixers 405 is an example of, or includes aspects of, the corresponding element described with reference to FIG. 3. Oscillator 410 is an example of, or includes aspects of, the corresponding element described with reference to FIG. 3. ADCs 415 is an example of, or includes aspects of, the corresponding element described with reference to FIG. 3. Low pass filters 420 is an example of, or includes aspects of, the corresponding element described with reference to FIG. 3.

Phase conversion component 430 is an example of, or includes aspects of, the corresponding element described with reference to FIG. 3. Phase to frequency component 435 is an example of, or includes aspects of, the corresponding element described with reference to FIG. 3. Frequency offset estimation circuits 440 is an example of, or includes aspects of, the corresponding element described with reference to FIGS. 2 and 3. Correlation circuits 445 is an example of, or includes aspects of, the corresponding element described with reference to FIGS. 2 and 3. Offset selection circuit 450 is an example of, or includes aspects of, the corresponding element described with reference to FIGS. 2 and 3.

Demodulator 455 is an example of, or includes aspects of, the corresponding element described with reference to FIGS. 2 and 3.

Figure 5:
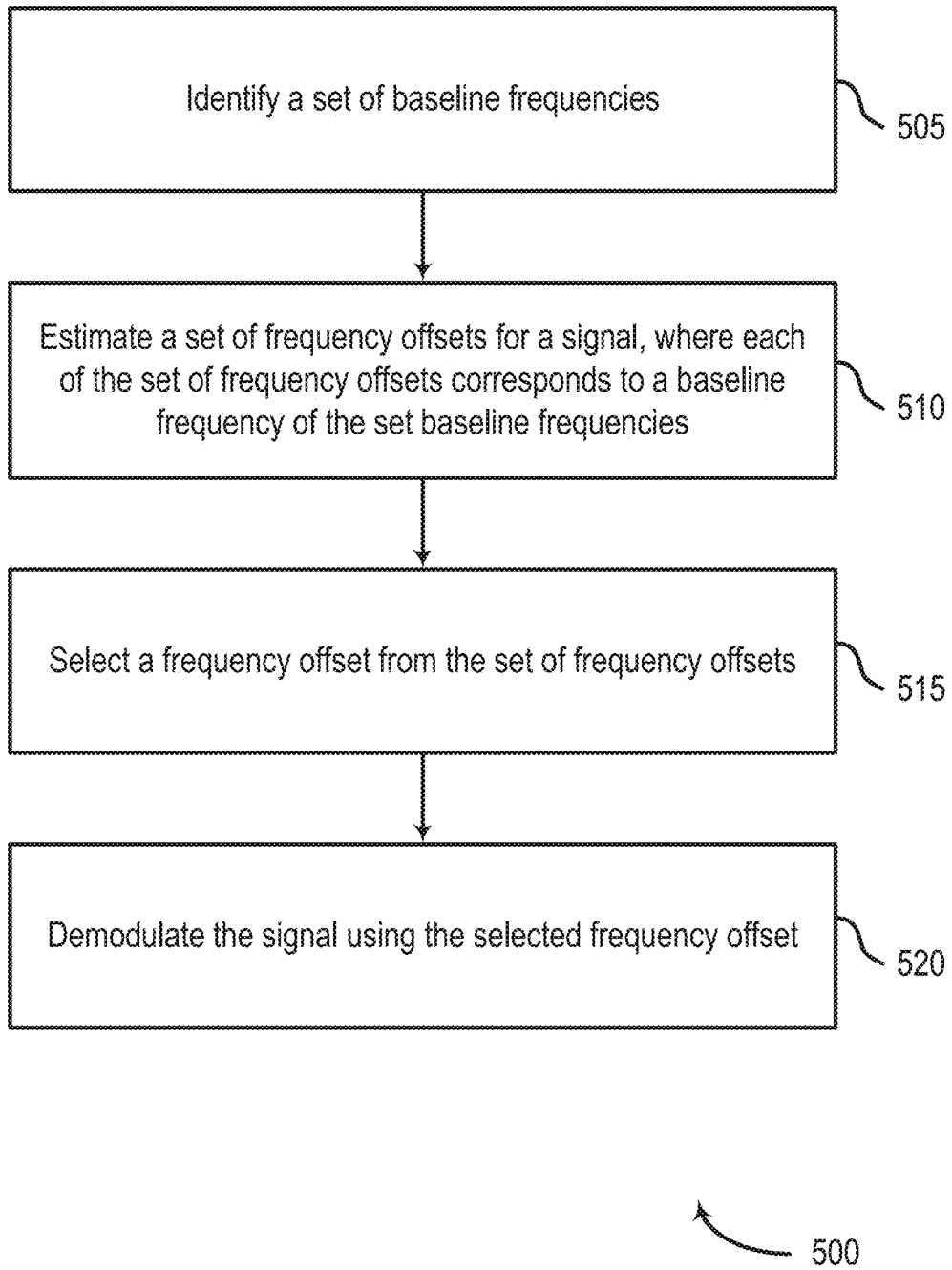
FIGS. 5 and 6 show examples of methods for communications according to aspects of the present disclosure.

FIG. 5 shows an example of a method 500 for wireless communications according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The techniques described herein may be implemented such that frequency estimation is performed as a part of a multi-branch (e.g., parallel stream) processing system. Such techniques may be able to manage scenarios with slowly changing dynamic frequency errors (e.g., slowly changing dynamic frequency errors across the payload and Access Address). As described in more detail herein, such may dramatically extend the carrier frequency offset error detection capture range (e.g., which may be used, for example, in Bluetooth systems, which have a smaller frequency deviation and are otherwise less robust to frequency errors).

At operation 505, the system identifies a set of baseline frequencies. In some cases, the operations of this step refer to, or may be performed by, a frequency estimator as described with reference to FIGS. 2-4.

At operation 510, the system estimates a set of frequency offsets for a signal, where each of the set of frequency offsets corresponds to a baseline frequency of the set baseline frequencies. In some cases, the operations of this step refer to, or may be performed by, a frequency offset estimation circuits as described with reference to FIGS. 2-4.

At operation 515, the system selects a baseline frequency and a frequency offset from the set of frequency offsets (e.g., the system selects a baseline frequency/frequency offset combination). In some cases, the operations of this step refer to, or may be performed by, an offset selection circuit as described with reference to FIGS. 2-4.

At operation 520, the system demodulates the signal using the selected frequency offset. In some cases, the operations of this step refer to, or may be performed by, a demodulator as described with reference to FIGS. 2-4.

An apparatus, non-transitory computer readable medium, and system for carrier frequency error estimation (e.g., using a bank of estimators with limited acquisition range) are also described. One or more aspects of the described method, apparatus, non-transitory computer readable medium, and system include identifying a plurality of baseline frequencies; estimating a plurality of frequency offsets for a signal, wherein each of the plurality of frequency offsets corresponds to a baseline frequency of the plurality baseline frequencies; selecting a frequency offset from the plurality of frequency offsets; and demodulating the signal using the selected frequency offset.

Some examples of the method, apparatus, non-transitory computer readable medium, and system further include identifying a first baseline frequency corresponding to an unmodified baseline frequency of the signal. Some examples further include identifying a second bassline frequency that is higher than the first baseline frequency. Some examples further include identifying a third baseline frequency that is lower than the first baseline frequency, wherein the plurality of baseline frequencies includes the first baseline frequency, the second baseline frequency and the third baseline frequency.

In some aspects, an absolute difference between the first baseline frequency and the second baseline frequency is equal to an absolute difference between the first baseline frequency and the third baseline frequency.

Some examples of the method, apparatus, non-transitory computer readable medium, and system further include selecting the plurality of baseline frequencies based on a historical distribution of frequency offsets.

Some examples of the method, apparatus, non-transitory computer readable medium, and system further include performing a zero-crossing min-max operation on the signal based on each of the plurality of baseline frequencies, wherein the plurality of frequency offsets are estimated based on the zero-crossing min-max operation.

Some examples of the method, apparatus, non-transitory computer readable medium, and system further include performing a correlation operation on the signal for each of the plurality of frequency offsets to obtain a correlation value corresponding to each of the plurality of frequency offsets, wherein the frequency offset is selected based on the correlation value.

Some examples of the method, apparatus, non-transitory computer readable medium, and system further include identifying a highest correlation value among the correlation values corresponding to the plurality of frequency offsets, wherein the frequency offset is selected based on the highest correlation value. In some aspects, the correlation operation is performed on a preamble of the signal. In some aspects, the correlation operation is performed on an Access Address, an access word, or a sync word of the signal.

Some examples of the method, apparatus, non-transitory computer readable medium, and system further include computing a first frequency offset first from among the plurality of frequency offsets before computing other frequency offsets of the plurality of frequency offsets, wherein the frequency offset is selected based at least in part on computing the first frequency offset first.

Some examples of the method, apparatus, non-transitory computer readable medium, and system further include identifying a waiting time. Some examples further include waiting for a second frequency offset after receiving the first frequency offset based on the waiting time. In some aspects, the signal comprises a Bluetooth Low Energy (BLE) signal.

Some examples of the method, apparatus, non-transitory computer readable medium, and system further include converting signal to a phase representation. Some examples further include incrementing a phase difference of the signal (e.g., adding or subtracting an incrementing phase from the signal) to obtain a plurality of phase signals corresponding plurality of baseline frequencies.

Figure 6:
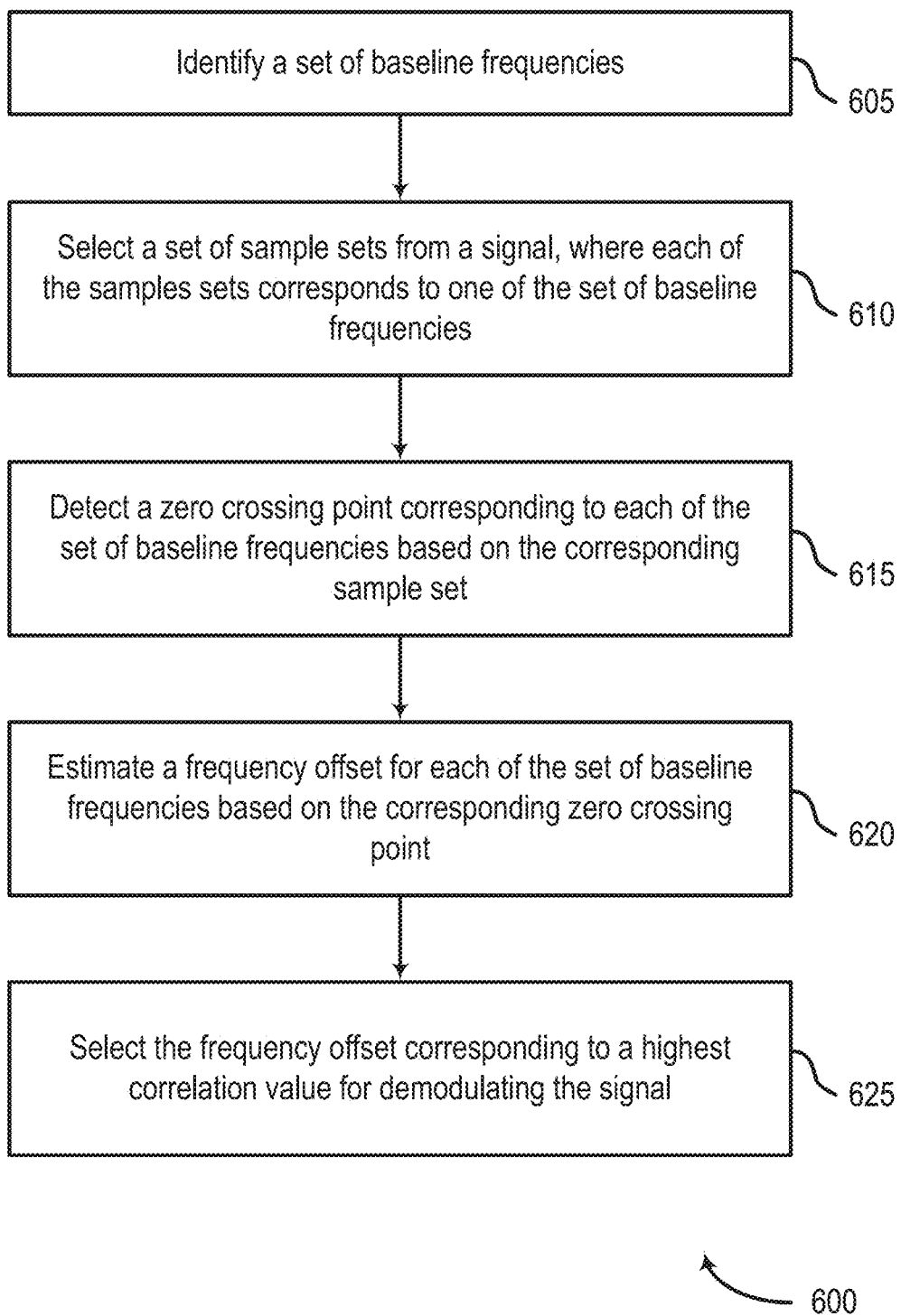

FIG. 6 shows an example of a method 600 for wireless communications according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system identifies a set of baseline frequencies. In some cases, the operations of this step refer to, or may be performed by, a frequency estimator as described with reference to FIGS. 2-4.

At operation 610, the system selects a set of sample sets from a signal, where each of the samples sets corresponds to one of the set of baseline frequencies. In some cases, the operations of this step refer to, or may be performed by, a frequency estimator as described with reference to FIGS. 2-4.

At operation 615, the system detects a zero crossing point corresponding to each of the set of baseline frequencies based on the corresponding sample set. In some cases, the operations of this step refer to, or may be performed by, a frequency offset estimation circuits as described with reference to FIGS. 2-4.

At operation 620, the system estimates a frequency offset for each of the set of baseline frequencies based on the corresponding zero crossing point. In some cases, the operations of this step refer to, or may be performed by, a frequency offset estimation circuits as described with reference to FIGS. 2-4.

At operation 625, the system selects the frequency offset corresponding to a highest correlation value for demodulating the signal. In some cases, the operations of this step refer to, or may be performed by, an offset selection circuit as described with reference to FIGS. 2-4.

An apparatus, non-transitory computer readable medium, and system for carrier frequency error estimation (e.g., using a bank of estimators with limited acquisition range) are also described. One or more aspects of the described method, apparatus, non-transitory computer readable medium, and system include identifying a plurality of baseline frequencies; selecting a plurality of sample sets from a signal, wherein each of the samples sets corresponds to one of the plurality of baseline frequencies; detecting a zero crossing point corresponding to each of the plurality of baseline frequencies based on the corresponding sample set; estimating a frequency offset for each of the plurality of baseline frequencies based on the corresponding zero crossing point; and selecting the frequency offset corresponding to a highest correlation value for demodulating the signal.

Some examples of the method, apparatus, non-transitory computer readable medium, and system further include performing a correlation operation on the signal based on the frequency offset to obtain the correlation value. Some examples of the method, apparatus, non-transitory computer readable medium, and system further include demodulating the signal using the selected frequency offset.

FIG. 7 shows an example of a method 700 for frequency estimation and preamble correlation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system identifies input data (e.g., IQ samples). In some cases, the operations of this step refer to, or may be performed by, a low pass filters as described with reference to FIGS. 3 and 4. In some cases, the operations of this step refer to, or may be performed by, a frequency estimator as described with reference to FIGS. 2-4.

At operation 710, the system converts the input data (e.g., the IQ samples) to phase (e.g., phase information). In some cases, the operations of this step refer to, or may be performed by, a phase conversion component as described with reference to FIGS. 3 and 4.

At operation 715, the system converts to frequency (e.g., the phase may be differenced to give a frequency, such as a FM demodulation). In some cases, the operations of this step refer to, or may be performed by, a phase to frequency component as described with reference to FIGS. 3 and 4.

At operation 720, the system splits signal processing into multiple streams (e.g., the frequency information may be split into three carrier frequency error candidates for parallel processing). In some cases, the operations of this step refer to, or may be performed by, a frequency estimator as described with reference to FIGS. 2-4.

At operation 725, the system adds a different frequency error for each stream (e.g., for each stream, add a different frequency error for −120 kHz, 0 kHz, 120 kHz). In some cases, the operations of this step refer to, or may be performed by, a frequency estimator as described with reference to FIGS. 2-4.

At operation 730, the system passes each stream into a frequency estimator (e.g., a min/max frequency estimator) and use estimate to compensate for frequency error. In some cases, the operations of this step refer to, or may be performed by, a frequency offset estimation circuits as described with reference to FIGS. 2-4.

At operation 735, the system converts each stream into bits. In some cases, the operations of this step refer to, or may be performed by, a frequency estimator as described with reference to FIGS. 2-4.

At operation 740, the system stores the bits. In some cases, the operations of this step refer to, or may be performed by, a frequency estimator as described with reference to FIGS. 2-4.

At operation 745, the system correlates the bits (e.g., against a 5 bit preamble pattern) for every stream. In some cases, the operations of this step refer to, or may be performed by, a correlation circuits as described with reference to FIGS. 2-4.

At operation 750, the system selects a frequency stream (e.g., select a frequency offset from the set of frequency offsets to use for demodulation, as described in more detail herein). In some cases, the operations of this step refer to, or may be performed by, an offset selection circuit as described with reference to FIGS. 2-4.

FIG. 8 shows an example of a method 800 for Access Address correlation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies input data (e.g., IQ samples). In some cases, the operations of this step refer to, or may be performed by, a low pass filters as described with reference to FIGS. 3 and 4. In some cases, the operations of this step refer to, or may be performed by, a frequency estimator as described with reference to FIGS. 2-4.

At operation 810, the system converts the input data (e.g., the IQ samples) to phase (e.g., phase information). In some cases, the operations of this step refer to, or may be performed by, a phase conversion component as described with reference to FIGS. 3 and 4. In some cases, the operations of this step refer to, or may be performed by, a frequency estimator as described with reference to FIGS. 2-4.

At operation 815, the system converts to frequency (e.g., the phase may be differenced to give a frequency, such as a FM demodulation). In some cases, the operations of this step refer to, or may be performed by, a phase to frequency component as described with reference to FIGS. 3 and 4. In some cases, the operations of this step refer to, or may be performed by, a frequency estimator as described with reference to FIGS. 2-4.

At operation 820, the system down samples (e.g., to 4 MHz (8 MHz BLE 2 Mbps)). In some cases, the operations of this step refer to, or may be performed by, a difference phase to frequency component as described with reference to FIGS. 3 and 4. In some cases, the operations of this step refer to, or may be performed by, a frequency estimator as described with reference to FIGS. 2-4.

At operation 825, the system splits signal processing into multiple streams (e.g., the frequency information may be split into three carrier frequency error candidates for parallel processing). In some cases, the operations of this step refer to, or may be performed by, a frequency estimator as described with reference to FIGS. 2-4.

At operation 830, the system adds a different frequency error for each stream (e.g., for each stream, add a different frequency error for −120 kHz, 0 kHz, 120 kHz). In some cases, the operations of this step refer to, or may be performed by, a frequency estimator as described with reference to FIGS. 2-4.

At operation 835, the system passes each stream into a frequency estimator (e.g., a min/max frequency estimator) and use estimate to compensate for frequency error. In some cases, the operations of this step refer to, or may be performed by, a frequency offset estimation circuits as described with reference to FIGS. 2-4.

At operation 840, the system searches for an Access Address, an access word, or a sync word of the signal. In some cases, the operations of this step refer to, or may be performed by, a correlation circuits as described with reference to FIGS. 2-4.

At operation 845, the system selects the frequency offset with the best synchronization (e.g., select a frequency offset from the set of frequency offsets). In some cases, the operations of this step refer to, or may be performed by, an offset selection circuit as described with reference to FIGS. 2-4.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media.

For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
identifying a plurality of baseline frequencies;
estimating a plurality of frequency offsets for a signal, wherein each of the plurality of frequency offsets corresponds to a baseline frequency of the plurality baseline frequencies;
selecting a frequency offset from the plurality of frequency offsets; and
demodulating the signal using the selected frequency offset.

2. The method of claim 1, further comprising:
identifying a first baseline frequency corresponding to an unmodified baseline frequency of the signal;
identifying a second bassline frequency that is higher than the first baseline frequency; and
identifying a third baseline frequency that is lower than the first baseline frequency, wherein the plurality of baseline frequencies includes the first baseline frequency, the second baseline frequency and the third baseline frequency.

3. The method of claim 2, wherein:
an absolute difference between the first baseline frequency and the second baseline frequency is equal to an absolute difference between the first baseline frequency and the third baseline frequency.

4. The method of claim 1, further comprising:
selecting the plurality of baseline frequencies based on a historical distribution of frequency offsets.

5. The method of claim 1, further comprising:
performing a zero-crossing min-max operation on the signal based on each of the plurality of baseline frequencies, wherein the plurality of frequency offsets are estimated based on the zero-crossing min-max operation.

6. The method of claim 1, further comprising:
performing a correlation operation on the signal for each of the plurality of frequency offsets to obtain a correlation value corresponding to each of the plurality of frequency offsets, wherein the frequency offset is selected based on the correlation value.

7. The method of claim 6, further comprising:
identifying a highest correlation value among the correlation values corresponding to the plurality of frequency offsets, wherein the frequency offset is selected based on the highest correlation value.

8. The method of claim 6, wherein:
the correlation operation is performed on a preamble of the signal.

9. The method of claim 6, wherein:
the correlation operation is performed on an Access Address, an access word, or a sync word of the signal.

10. The method of claim 1, further comprising:
computing a first frequency offset first from among the plurality of frequency offsets before computing other frequency offsets of the plurality of frequency offsets, wherein the frequency offset is selected based at least in part on computing the first frequency offset first.

11. The method of claim 10, further comprising:
identifying a waiting time; and
waiting for a second frequency offset after receiving the first frequency offset based on the waiting time.

12. The method of claim 1, wherein:
the signal comprises a Bluetooth Low Energy (BLE) signal.

13. The method of claim 1, further comprising:
converting signal to a phase representation; and
incrementing a phase difference of the signal to obtain a plurality of phase signals corresponding plurality of baseline frequencies.

14. A method comprising:
identifying a plurality of baseline frequencies;
selecting a plurality of sample sets from a signal, wherein each of the samples sets corresponds to one of the plurality of baseline frequencies;
detecting a zero crossing point corresponding to each of the plurality of baseline frequencies based on the corresponding sample set;
estimating a frequency offset for each of the plurality of baseline frequencies based on the corresponding zero crossing point; and
selecting the frequency offset corresponding to a highest correlation value for demodulating the signal.

15. The method of claim 14, further comprising:
performing a correlation operation on the signal based on the frequency offset to obtain the correlation value.

16. The method of claim 14, further comprising:
demodulating the signal using the selected frequency offset.

17. An apparatus comprising:
a receiver configured to receive a signal;
a plurality of frequency offset estimation circuits configured to estimate a plurality of frequency offsets for the signal, wherein each of the plurality of frequency offset estimation circuits operates based on a different baseline frequency from a plurality baseline frequencies; and
an offset selection circuit configured to select a frequency offset from the plurality of frequency offsets.

18. The apparatus of claim 17, further comprising:
a demodulator configured to demodulate the signal based on the selected frequency offset.

19. The apparatus of claim 17, further comprising:
a plurality of correlation circuits configured to perform a correlation operation on the signal, wherein each of the plurality of correlation circuits obtains a correlation value for a corresponding frequency offset of the plurality of frequency offsets.

20. The apparatus of claim 17, wherein:
the plurality of frequency offset estimation circuits are configured to perform a zero-crossing min-max operation on the signal based on a corresponding baseline frequency of the plurality of baseline frequencies.

* * * * *